US011462895B2

(12) United States Patent
Otsuba

(10) Patent No.: US 11,462,895 B2
(45) Date of Patent: Oct. 4, 2022

(54) JUNCTION BOX WITH JUMP START TERMINAL AND WATER MITIGATION FEATURES

(71) Applicant: Sumitomo Wiring Systems, Ltd., Mie (JP)

(72) Inventor: Kazuto Otsuba, Marysville, OH (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 372 days.

(21) Appl. No.: 16/844,761

(22) Filed: Apr. 9, 2020

(65) Prior Publication Data

US 2021/0320483 A1 Oct. 14, 2021

(51) Int. Cl.
*H02G 3/08* (2006.01)
*H02G 3/16* (2006.01)

(52) U.S. Cl.
CPC ............ *H02G 3/088* (2013.01); *H02G 3/081* (2013.01); *H02G 3/16* (2013.01)

(58) Field of Classification Search
CPC ...... B60R 16/0238; H02G 3/16; H02G 3/088; H02G 3/081
See application file for complete search history.

(56) References Cited

U.S. PATENT DOCUMENTS

| | | | | |
|---|---|---|---|---|
| 4,963,099 A | * | 10/1990 | Sato | H01R 9/2466 439/205 |
| 5,703,325 A | * | 12/1997 | Yamaguchi | H02G 3/088 220/804 |
| 6,037,550 A | * | 3/2000 | Bradley | G01G 19/12 177/136 |
| 9,698,583 B1 | * | 7/2017 | Matsumura | H02G 3/088 |
| 2005/0194167 A1 | * | 9/2005 | Kiyota | H02G 3/081 174/17 VA |
| 2006/0021779 A1 | * | 2/2006 | Kanazawa | H02G 3/088 174/67 |
| 2010/0127012 A1 | * | 5/2010 | Takeuchi | H02G 3/14 220/810 |
| 2013/0335889 A1 | * | 12/2013 | Makino | H05K 5/0239 361/641 |
| 2014/0231129 A1 | * | 8/2014 | Kakimi | H01H 9/04 174/535 |
| 2014/0311793 A1 | * | 10/2014 | Kaneko | H02G 3/081 174/560 |
| 2015/0016076 A1 | * | 1/2015 | Shimizu | H02G 3/16 361/753 |

(Continued)

*Primary Examiner* — Timothy J Thompson
*Assistant Examiner* — Rhadames Alonzo Miller
(74) *Attorney, Agent, or Firm* — Honigman LLP

(57) ABSTRACT

A junction box assembly includes an upper cover coupled to a lower cover assembly. The upper cover has a jump start terminal housing and a first through hole which accommodates a jump start terminal. The lower cover assembly includes a fuse assembly having an upper case and a lower case configured to hold a bus bar unit having a plurality of fuses. The upper case includes a collar and a first drain hole. The collar defines a second through hole and is concentric to the jump start terminal. The first drain hole is spaced apart from the fuses. The first drain hole is open to a second hole of the bus bar unit. The lower case includes a second drain hole open to the second hole. Accordingly, water is routed through the fuse assembly and away from the fuses so as to retain the functionality of the junction box assembly.

20 Claims, 8 Drawing Sheets

(56) References Cited

U.S. PATENT DOCUMENTS

| | | | |
|---|---|---|---|
| 2015/0029686 A1* | 1/2015 | Shimizu | H05K 5/0013 |
| | | | 361/752 |
| 2015/0171608 A1* | 6/2015 | Ueyama | H05K 5/0004 |
| | | | 174/50 |
| 2015/0250070 A1* | 9/2015 | Anami | H05K 7/026 |
| | | | 361/752 |
| 2015/0303666 A1* | 10/2015 | Shimizu | H02G 3/16 |
| | | | 361/752 |
| 2016/0197462 A1* | 7/2016 | Hamada | H02G 3/088 |
| | | | 174/50 |
| 2016/0215967 A1* | 7/2016 | Chad | F21V 31/005 |
| 2017/0040789 A1* | 2/2017 | Bonilla | H02G 9/10 |
| 2018/0017243 A1* | 1/2018 | Palmer | F21V 23/06 |
| 2018/0065576 A1* | 3/2018 | Kawaguchi | H01R 9/226 |
| 2019/0067924 A1* | 2/2019 | Aichi | H02G 3/081 |
| 2020/0049376 A1* | 2/2020 | Hutchison | H05K 5/069 |
| 2021/0083463 A1* | 3/2021 | Washihira | H02G 3/086 |
| 2021/0104880 A1* | 4/2021 | Kurata | H02G 3/081 |

\* cited by examiner

US 11,462,895 B2

JUNCTION BOX WITH JUMP START TERMINAL AND WATER MITIGATION FEATURES

TECHNICAL FIELD

The present specification generally relates to junction box assemblies and more particularly to a junction box assembly having a jump start terminal.

BACKGROUND

In general junction box assemblies include a power distribution box for storing electric components configured to regulate power to various electric components within a vehicle. Generally stated, power is supplied to the power distribution box by a battery. The power is regulated using commonly known components such as switches, relays, fuses, capacitors, resistors and the like.

It is known to provide a jump start terminal in the junction box. The jump start terminal is an electrically conductive bolt or bus bar. The jump start terminal is connected to the starter system (to include the battery, alternator and starter) and may be accessed so as to jump start the vehicle in the event that the vehicle battery is dead.

In inclement weather, such as rain, water may fall into the electric junction box and find its way into sensitive electric components such as fuses and the like. This may cause electrical short circuits, damaging electric components.

Accordingly, it remains desirable to have a junction box assembly wherein the water is directed away from electric sensitive components so as to preserve the functionality of the junction box assembly when the jump start terminal is exposed to the environment.

SUMMARY

In one embodiment a junction box assembly includes a jump start terminal and a water channel configured to direct water away from fuses disposed in a bus bar unit. The junction box assembly further includes an upper cover that is coupled to a lower cover assembly. The upper cover has a jump start terminal housing. The jump start terminal housing includes a floor and a first through hole is disposed on the floor. The first through hole is dimensioned to accommodate the jump start terminal and the floor is dimensioned to direct water to the first through hole.

The junction box assembly includes a jump start terminal cover. The jump start terminal cover is coupled to the jump start terminal housing so as to cover the jump start terminal. The jump start terminal cover may be opened so as to provide access to the jump start terminal.

The lower cover assembly includes a fuse assembly. The fuse assembly includes an upper case, a lower case and a bus bar unit. The upper case and the lower case are seated onto respective top and bottom surfaces of the bus bar unit. The bus bar unit includes a plurality of fuses. The bus bar unit further includes terminals, the fuses are operatively connected to a respective terminal.

The upper case includes a first support member. The first support member has a collar defining a second through hole. The collar is concentric to the jump start terminal and the first through hole is concentric to the collar. The first support member further includes a first drain hole spaced apart from the plurality of fuses. The first support member is configured to direct water to the first drain hole. The first drain hole is open to a second hole. The second hole is formed in the bus bar unit. The lower case includes a second drain hole that is open to the second hole.

Accordingly, the junction box assembly is configured to direct water collected in the jump start terminal housing through the fuse assembly so as to avoid the fuses wherein water is then drained through a drain hole in the lower cover assembly.

In one aspect the floor is an inverted square based pyramid having an open top and an open bottom, wherein the open bottom defines the first through hole. The floor may further include a groove which extends along a corner of the inverted square-based pyramid so as to facilitate the drainage of water to the first through hole.

In another aspect of the junction box assembly, the upper case includes an inner peripheral wall bounding the first support member. The collar is generally centered within the inner peripheral wall and is taller than the inner peripheral wall.

In another aspect of the junction box assembly, the junction box assembly includes a plurality of first drain holes, second drain holes and second holes that are equal in number to each other and are registered to each other so as to form a continuous hole through the fuse assembly.

In yet another aspect of the electric junction box assembly, the first support member is dimensioned to guide water to a respective first drain hole so as to prevent water from collecting within the inner peripheral wall. For example, the first support member may include a triangular ramp having an apex generally centered between opposing sides of the inner peripheral wall.

Accordingly, the junction box assembly is configured to direct water which may have collected in the jump start terminal housing through the fuse assembly in a manner so as to avoid the fuses and into the lower cover assembly wherein the water may exit the junction box assembly through a drain.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION OF PREFERRED EMBODIMENTS

Referring generally to the figures, embodiments of the present disclosure include a junction box assembly having a jump start terminal and a water channel configured to direct water away from fuses disposed in a bus bar unit.

Figure 1:
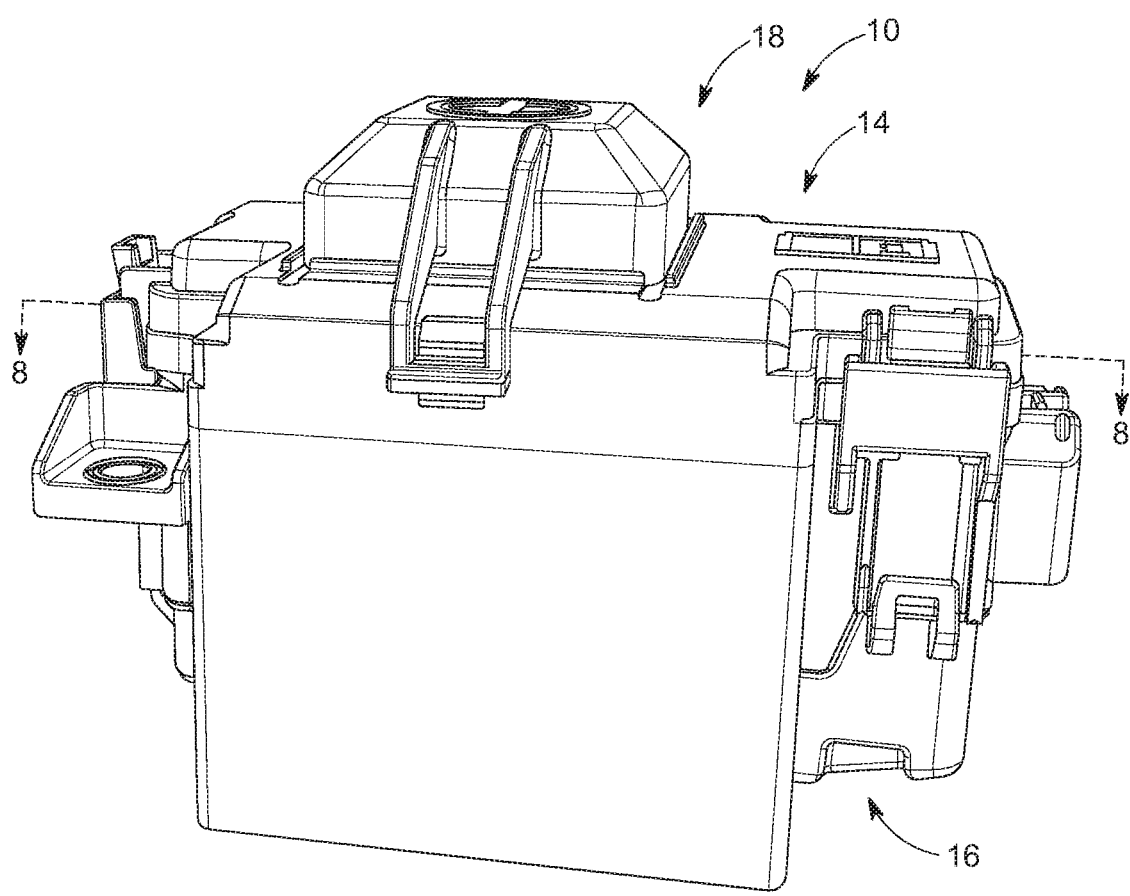
FIG. 1 schematically depicts a junction box assembly according to one or more embodiments illustrated herein.
Figure 2:
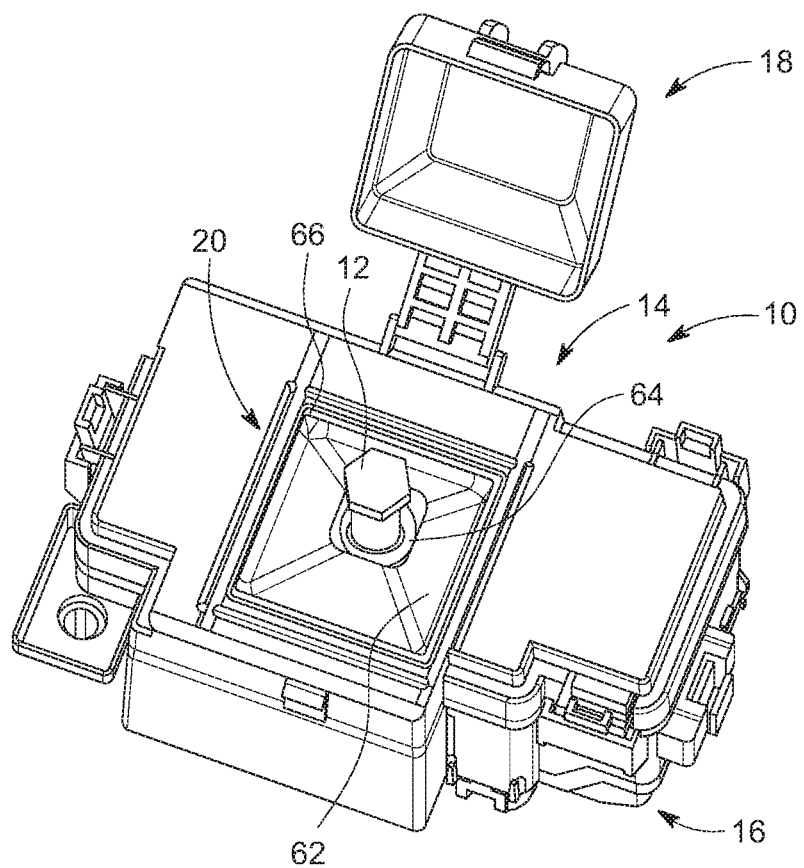
FIG. 2 is a perspective view of the upper cover showing the jump start terminal cover open.

With reference now to FIGS. 1 and 2 an illustrative embodiment of a junction box assembly 10 is provided. The junction box assembly 10 is configured to house a jump start terminal 12. The junction box assembly 10 includes an upper cover 14 that is coupled to a lower cover assembly 16.

The upper cover 14 includes a jump start terminal cover 18. The jump start terminal cover 18 is shown as being removably coupled to a top surface of the upper cover 14. The jump start terminal cover 18 is configured to cover a jump start terminal housing 20.

The upper cover 14 includes a plurality of mechanical fastening devices which engage corresponding structure of the lower cover assembly 16 so as to provide a snap fit engagement. Such mechanical fastening devices are known in the art and any such mechanical devices currently known in the art may be adapted for use herein.

The body of the upper cover 14 and the lower cover assembly 16 is formed of a resilient material, preferably of a material which may be manufactured through an injection molding process. The junction box assembly 10 is illustratively shown as having a generally cubical shape. However, it should be appreciated that the shape and dimensions of the junction box assembly 10 are provided for illustrative purposes only and it may deviate from what is shown in the drawings without limiting the scope of the appended claims.

With reference again now to FIG. 2, the jump start terminal cover 18 is shown in an open position. The jump start terminal cover 18 may be hingedly coupled to the upper cover 14 and includes a latch configured to engage a tab of the upper cover 14. The jump start terminal cover 18 is movable from a closed to an open position. As shown in FIG. 2 in the open position the jump start terminal 12 is exposed to the environment and thus may be exposed to rain and the like.

Figure 3:
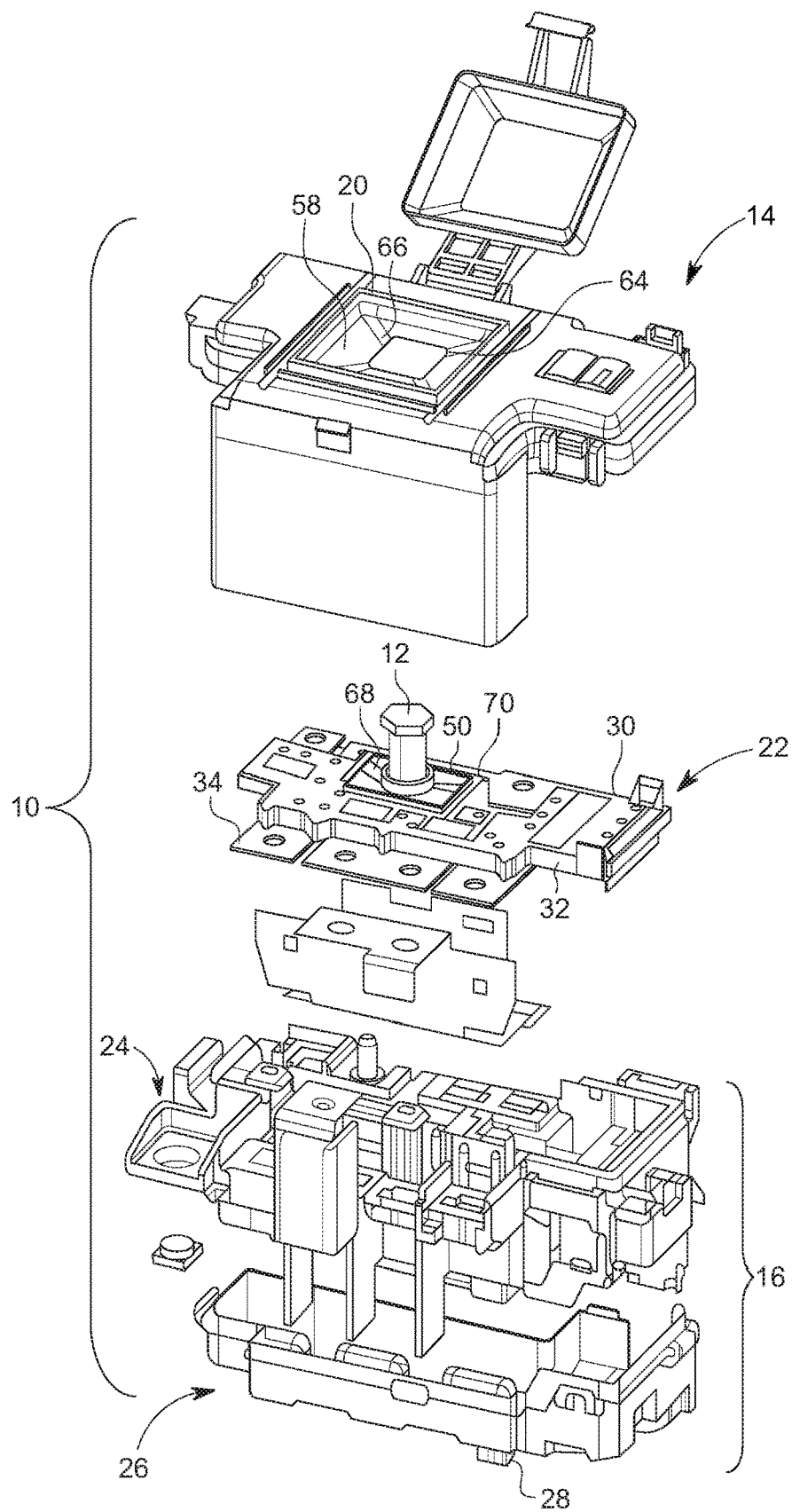
FIG. 3 is an exploded view of the junction box assembly shown in FIG. 1.

With reference now to FIG. 3, an exploded view of the junction box assembly 10 shown in FIG. 1 is provided. The upper cover 14 is spaced above the lower cover assembly 16. The lower cover assembly 16 includes a fuse assembly 22, a junction box base assembly 24 and a junction box lower cover 26. The junction box base assembly 24 includes compartments for holding electrical components such as relays, switches and the like. These components are purposely omitted from the Figures.

The junction box base assembly is fitted to the junction box lower cover 26. The junction box lower cover 26 includes a bottom drain 28. The bottom drain 28 is open to the exterior of the junction box lower cover 26 so as to allow water to escape. A lower portion of the junction box lower cover 26 may be angled so as to direct water to the bottom drain 28.

Figure 4:
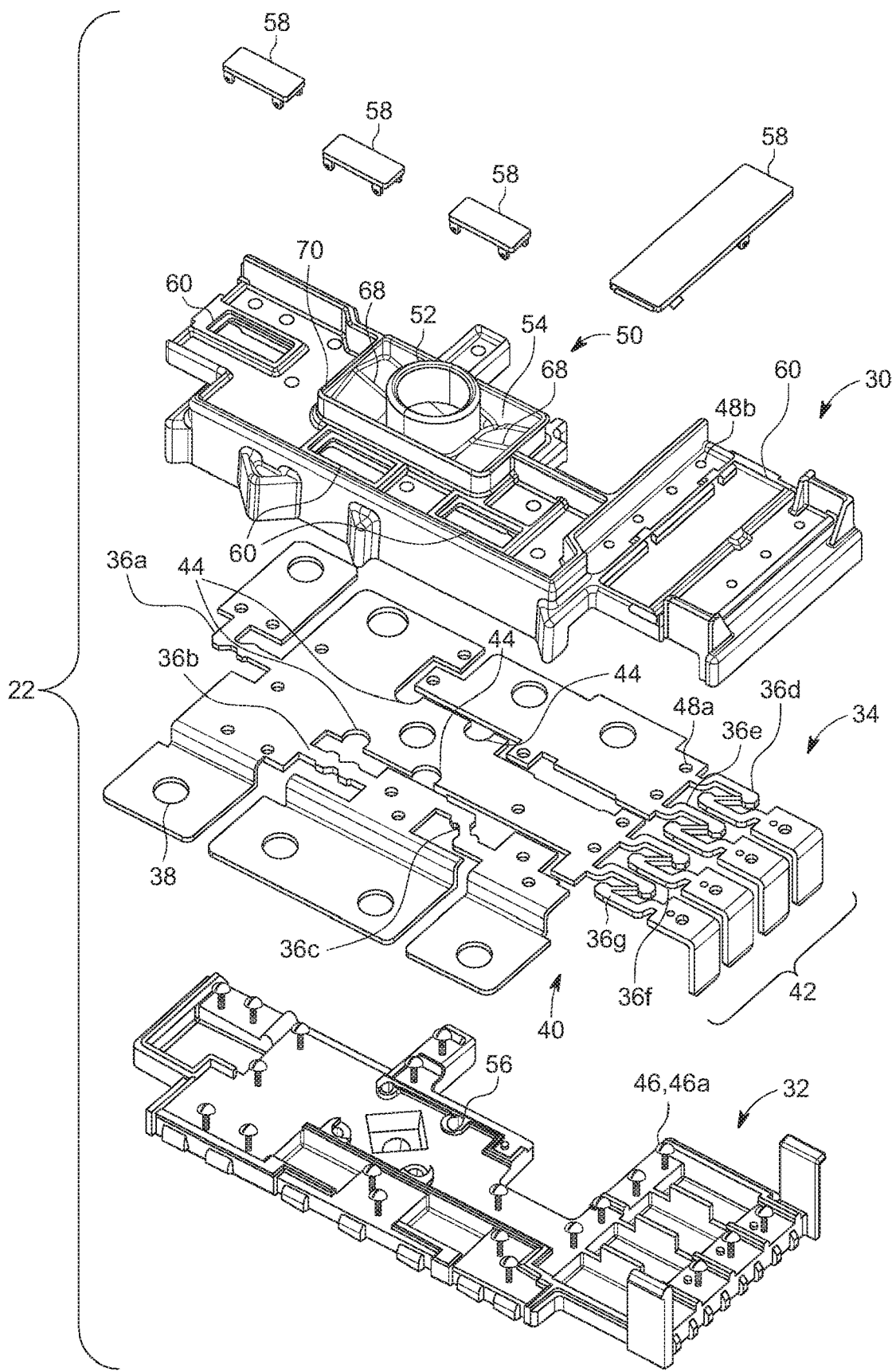
FIG. 4 is an exploded view of a fuse assembly.
Figure 5:
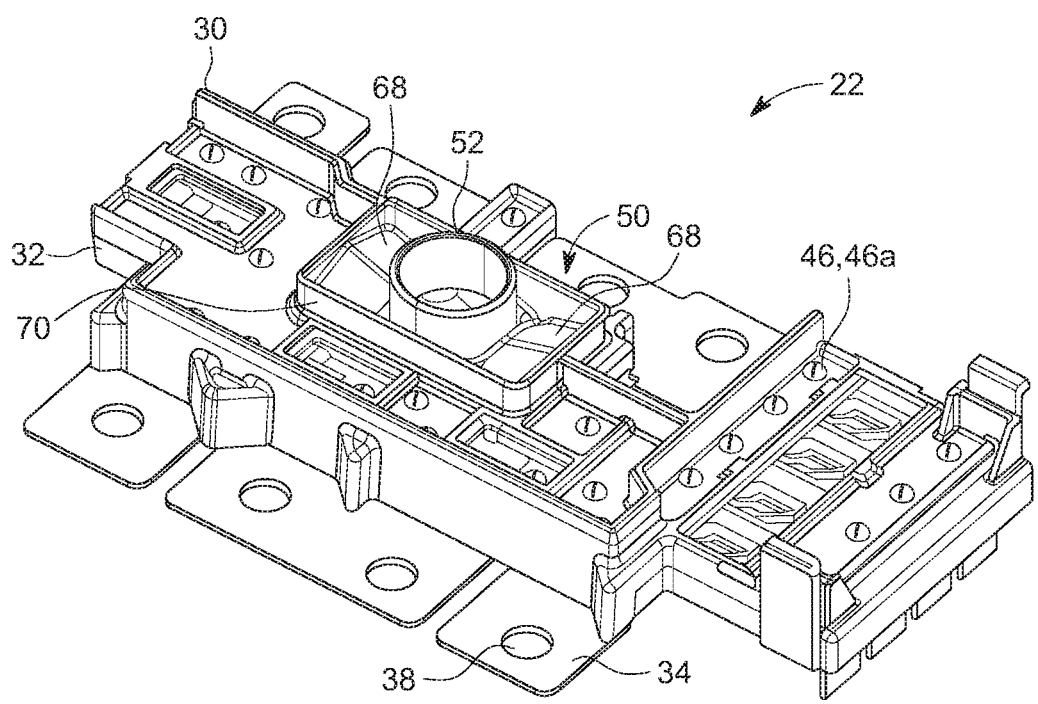
FIG. 5 is an assembled view of the fuse assembly.
Figure 6:
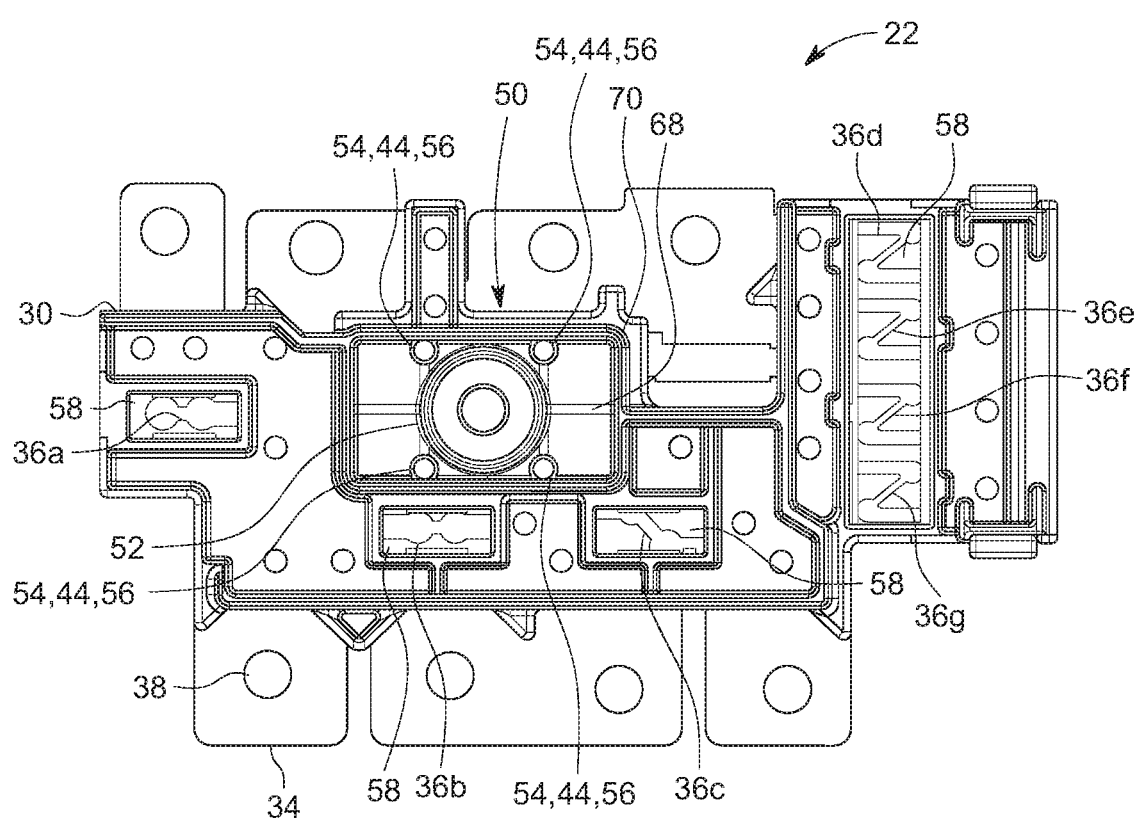
FIG. 6 is a top-down view of the fuse assembly.

With reference now to FIGS. 4-6, a description of the fuse assembly 22 is provided. FIG. 4 provides an exploded view of the fuse assembly 22. The fuse assembly 22 includes an upper case 30 and a lower case 32 and a bus bar unit 34. The upper case 30 is configured to be seated with the lower case 32 and the bus bar unit 34 is sandwiched in between the upper case 30 and the lower case 32, as shown in FIG. 5.

The bus bar unit 34 may be stamped out of an electrically conductive material. The bus bar unit 34 includes a plurality of fuse elements 36a-36g. The bus bar unit 34 includes a plurality of terminal holes 38 for attachment to an electric terminal. The terminal holes 38 are generally circular in dimension and is configured to receive an electric terminal in the form of an eyelet and is coupled to the bus bar using a threaded bolt and a nut. For simplicity, only one of the terminal holes 38 are pointed out.

The bus bar unit 34 includes a back-end 40 having a plurality of direct terminal connectors 42. Each of the direct terminal connectors 42 is coupled to the back-end 40 by fuse elements 36d-36g. The direct terminal connectors 42 are generally L-shaped and are configured to receive a terminal connection (not shown). In particular, the direct terminal connectors 42 have a portion that is bent downwardly, and thus water may drain into the terminal connection.

In the center of the bus bar unit 34 a plurality of second holes 44 are formed. In this illustrative embodiment four second holes 44 are shown. The second holes 44 are configured to allow water to pass, as will be described in greater detail below.

The upper case 30 and the lower case 32 include attachment features 46 so as to secure the upper case 30 to the lower case 32 with the bus bar unit 34 disposed in there between. In one illustrative example of an attachment feature 46, the lower case 32 includes a plurality of prongs 46a having an enlarged end. The prongs 46a are configured to be passed through a corresponding prong hole 48a of the bus bar unit 34 and a corresponding prong hole 48b of the upper case 30 wherein the prongs 46a of the lower case 32 are dimensioned to extend past the upper surface of the upper case 30 and the prongs 46a are heat staked so as to form an enlarged end which holds the upper case 30 and the lower case 32 together as illustratively shown in FIG. 5, placing the bus bar unit 34 between the upper case 30 and the lower case 32.

The upper case 30 includes a first support member 50. The first support member 50 includes a collar 52 defining a second through hole. The collar 52 is configured to accommodate a portion of the jump start terminal 12. The first support member 50 includes a first drain hole 54 that is spaced apart from the plurality of fuse elements 36a-36g. The first support member 50 is configured to direct water to the first drain hole 54. The first drain hole 54 is open to a corresponding one of the second holes 44 of the bus bar unit 34.

Figure 7:
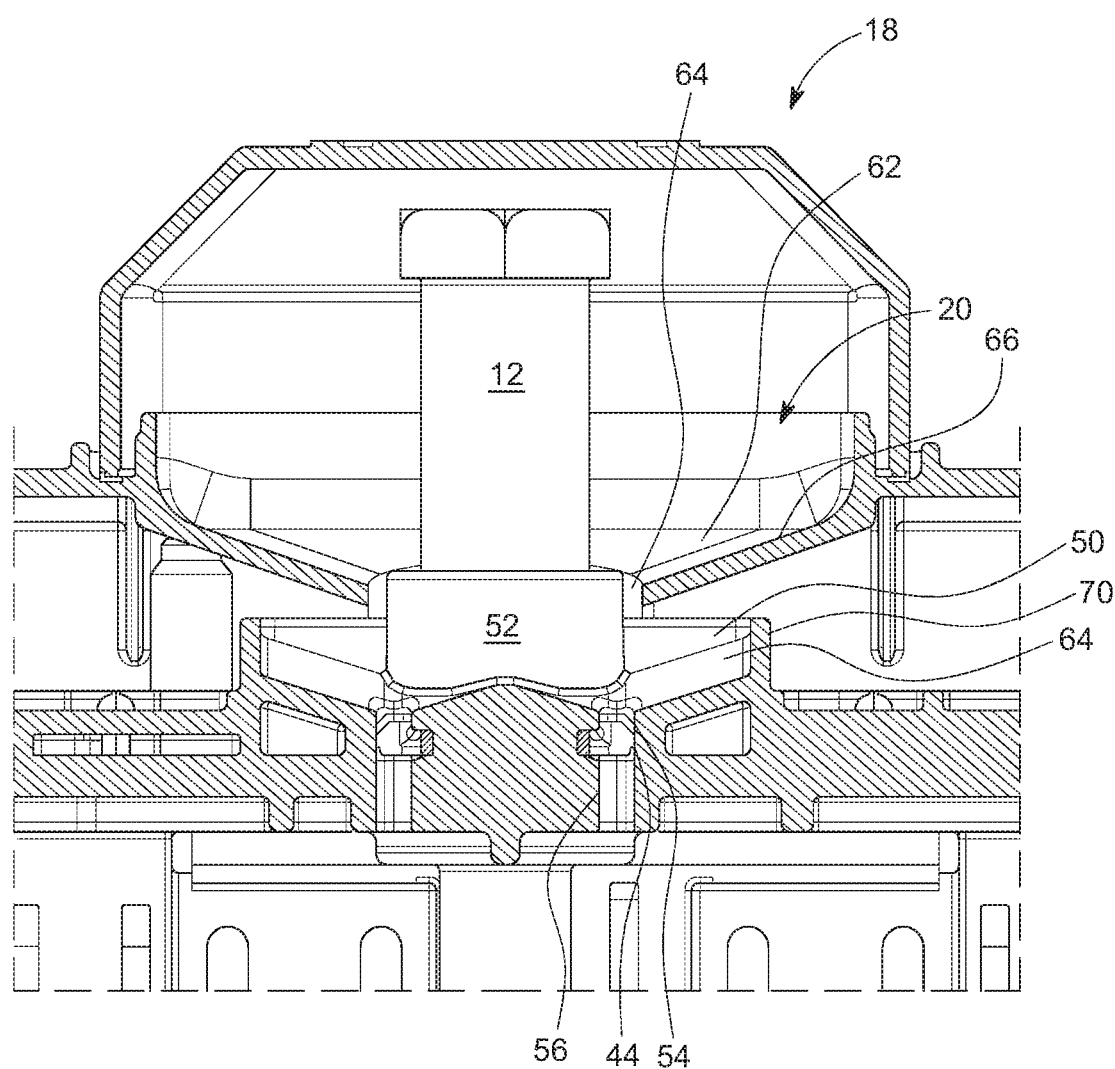
FIG. 7 is a close-up view showing the jump start terminal cover closed onto the jump start terminal housing.

The lower case 32 includes a second drain hole 56 that is open to both the second hole 44 and the first drain hole 54. As shown in FIG. 7, the first drain hole 54, the second hole 44 and the second drain hole 56 are fluidly aligned with each other so as to form a water channel 100 (as indicated by the arrows shown in FIG. 8) which passes through the fuse assembly 22. The first drain hole 54, the second hole 44 and the second drain hole 56 form a lower portion of the water channel 100 which is spaced apart laterally from the fuse elements 36d-36g of the bus bar unit 34.

In one aspect, the fuse assembly 22 may further include a protective cover 58. The upper case 30 includes a plurality of openings 60 which are disposed above a respective fuse element 36a-36g. The openings 60 are configured to receive a respective protective cover 58. The protective cover 58 may include retention tabs for forming a snap-fit engagement with the upper case 30.

FIG. 6 shows an embodiment where the fuse elements 36a-36g are covered by the protective cover 58 illustrating how the first drain hole 54, the second hole 44 and the second drain hole 56 are configured to allow water to pass through the fuse assembly 22 without reaching the fuse element 36a-36g. In other words, the first drain hole 54, the second hole 44 and the second drain hole 56 are laterally spaced apart from the fuse elements 36a-36g.

With reference again to FIG. 2 and now to FIG. 7, the jump start terminal housing 20 includes a floor 62 and a first through hole 64 that is disposed on the floor 62. In one aspect the floor 62 is a generally inverted square-based pyramid having a wider open top relative to an open bottom. Such a configuration facilitates drainage of water through the first through hole 64. The open bottom defines the first through hole 64.

FIGS. 2 and 7 illustrate the jump start terminal 12 being generally centered within the first through hole 64 and extending through the first through hole 64. The floor 62 may include a groove 66 which extends along a corner of the jump start terminal housing 20. In this case four grooves 66 are defined, each extending from a corner towards the center of the floor 62 thus preventing water from collecting within the jump start terminal housing 20 while directing water into the first through hole 64.

With reference again to FIGS. 4-6, in one aspect the first support member 50 includes a pair of ramps 68 that are disposed on opposite sides of the collar 52. An inner peripheral wall 70 bounds the ramps 68 and the collar 52 so as to prevent water from seeping in to the fuse elements 36a-36g. The inner peripheral wall 70 may have a height that is shorter than a height of the collar 52. The ramps 68 are a triangular pyramid having an apex that is generally centered between opposite sides of the inner peripheral wall 70.

The ramps 68 are on opposite sides of the collar 52. In one aspect, the first drain hole 54 is adjacent to the collar 52 and disposed at the bottom portion of a respective ramp 68. For illustrative purposes the fuse assembly 22 is shown as having four first drain holes 54, each are generally equally spaced apart from each other. The drains holes 54 are at the bottom of each ramp 68, wherein the ramps 68 assist in draining water through the first drain hole 54.

In one aspect, the fuse assembly includes four lower water channels 100 which are defined by a corresponding first drain hole 54 of the first support member 50, second hole of the bus bar unit 34 and second drain hole 56 of the lower cover. However, it should be appreciated that the number of lower water channels may deviate from what is shown in the drawings without limiting the scope of the appended claims.

Figure 8:
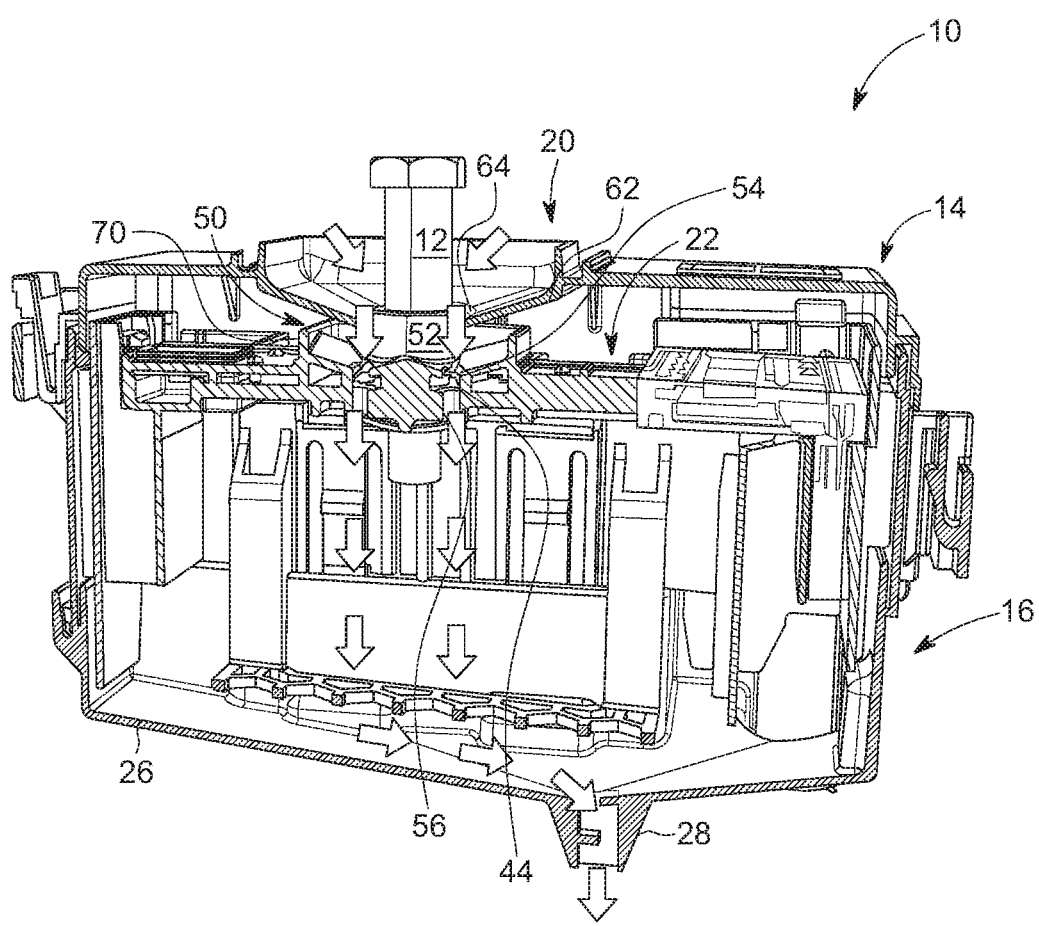
FIG. 8 is a cross-sectional view of the junction box assembly shown in FIG. 1 taken along lines 8-8.

With reference now to FIG. 8, a description of the operation of the junction box assembly 10 is provided. In the event that a user needs to access the jump start terminal 12, the jump start terminal cover 18 is moved to the open position. Should this occur during rain, water may be collected in the jump start terminal housing 20. The water is directed to the first through hole 64 and into the lower water channel 100 and passes through the fuse assembly 22 into the lower cover 26 and is discharged through the bottom drain 28. In particular, the water is facilitated into the first through hole 64 by the angled floor 62.

The arrows indicate the path of water. For illustrative purposes, the jump start terminal cover 18 has been removed so as to demonstrate water collected in the jump start terminal housing 20, as would be the case when the jump start terminal 12 is accessed for a vehicle jump start. As water is collected in the jump start terminal housing 20, the water is directed to the first through hole 64 by the angled floor 62. As water passes through the first through hole 64, the water is collected by the first support member 50 and is contained by the inner peripheral wall 70 of the first support member 50.

The ramps 68 guide the water into the first drain hole 54 of the first support member 50 and passes through the second hole 44 of the bus bar unit 34 and then through the second drain hole 56 of the lower cover. Thus, the fuse elements of the bus bar unit 34 are not exposed to water which has entered into the junction box assembly 10 so as to maintain the functional operation of the junction box assembly 10.

As shown in FIG. 8, water may be gravity fed into a terminal connection (not shown) attached to the L-shaped direct terminal connectors 42. Thus, the water channel prevents such an occurrence by providing a path of water through the fuse assembly 22 which is spaced apart laterally from the L-shaped direct terminal connectors 42.

While particular embodiments have been illustrated and described herein, it should be appreciated and understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A junction box assembly having a jump start terminal, the junction box assembly comprising:
   an upper cover coupled to a lower cover assembly, the upper cover having a jump start terminal housing, the jump start terminal housing including a floor and a first through hole is disposed on the floor, the first through hole for accommodating the jump start terminal, wherein the floor is dimensioned to direct water to the first through hole;
   a jump start terminal cover configured to be removably coupled to the jump start terminal housing so as to cover the jump start terminal and provide access to the jump start terminal; and
   wherein the lower cover assembly includes a fuse assembly having an upper case and a lower case configured to hold a bus bar unit having a plurality of fuses, wherein the upper case includes a first support member, the first support member having a collar defining a second through hole, the collar being concentric to the jump start terminal and the first through hole being concentric to the collar, the first support member further including a first drain hole spaced apart from each of the plurality of fuses, wherein the first support member is configured to direct water to the first drain hole, the first drain hole being open to a second hole in the bus bar unit, and wherein the lower case includes a second drain hole open to the second hole, the junction box assembly configured to direct water from the jump housing through the fuse assembly so as to avoid the plurality of fuses.

2. The junction box assembly as set forth in claim 1, wherein the floor is an inverted square based pyramid having an open top and an open bottom, the open bottom defining the first through hole.

3. The junction box assembly as set forth in claim 2, wherein the floor includes a groove extending along a corner.

4. The junction box assembly as set forth in claim 1, wherein the upper case includes an inner peripheral wall bounding the collar.

5. The junction box assembly as set forth in claim 1, wherein the first drain hole is a plurality of first drain holes surrounding the collar.

6. The junction box assembly as set forth in claim 5, wherein the upper case includes a pair of ramps disposed on opposite sides of the collar.

7. The junction box assembly as set forth in claim 6, wherein the upper case includes an inner peripheral wall bounding the collar.

8. The junction box assembly as set forth in claim 5, wherein the second drain hole is a plurality of second drain holes, the plurality of second drain holes being equal in number to the plurality of first drain holes.

9. The junction box assembly as set forth in claim 8, wherein the second hole is a plurality of second holes, the plurality of second holes equal in number to the plurality of second drain holes.

10. The junction box assembly as set forth in claim 9, wherein the plurality of first drain holes, the plurality of second drain holes and the plurality of holes are registered to each other.

11. A junction box assembly having a jump start terminal, the junction box assembly comprising:
   an upper cover coupled to a lower cover assembly, the upper cover having a jump start terminal housing, the jump start terminal housing including a floor and a first through hole is disposed on the floor, the first through hole for accommodating the jump start terminal, wherein the floor is dimensioned to direct water to the first through hole;
   a jump start terminal cover configured to be removably coupled to the jump start terminal housing so as to cover the jump start terminal and provide access to the jump start terminal; and
   wherein the lower cover assembly includes a fuse assembly having an upper case and a lower case configured to hold a bus bar unit having a plurality of fuses, wherein the upper case includes a collar defining a second through hole, the collar being concentric to the jump start terminal and a water channel in communication with the first through-hole, the water channel passing through the fuse assembly to a bottom drain open to the exterior of the lower cover assembly.

12. The junction box assembly as set forth in claim 11, wherein the upper case includes a first support member, the first support member having a includes a first drain hole spaced apart from each of the plurality of fuses, wherein the first support member is configured to direct water to the first drain hole, the first drain hole being open to a second hole in the bus bar unit, and wherein the lower case includes a second drain hole open to the second hole, the first drain hole, the second hole and the second drain hole define the water channel.

13. The junction box assembly as set forth in claim 12, wherein the floor is an inverted square based pyramid having an open top and an open bottom, the open bottom defining the first through hole.

14. The junction box assembly as set forth in claim 12, wherein the floor includes a groove extending along a corner.

15. The junction box assembly as set forth in claim 12, wherein the upper case includes an inner peripheral wall bounding the collar.

16. The junction box assembly as set forth in claim 12, wherein the first drain hole is a plurality of first drain holes surrounding the collar.

17. The junction box assembly as set forth in claim 16, wherein the upper case includes a pair of ramps disposed on opposite sides of the collar.

18. The junction box assembly as set forth in claim 17, wherein the upper case includes an inner peripheral wall bounding the collar.

19. The junction box assembly as set forth in claim 16, wherein the second drain hole is a plurality of second drain holes, the plurality of second drain holes being equal in number to the plurality of first drain holes.

20. The junction box assembly as set forth in claim 19, wherein the plurality of first drain holes, the plurality of second drain holes and the plurality of holes are registered to each other.

\* \* \* \* \*